US011426924B2

(12) United States Patent
Gorin et al.

(10) Patent No.: US 11,426,924 B2
(45) Date of Patent: Aug. 30, 2022

(54) THERMOSET ADDITIVE MANUFACTURED ARTICLES INCORPORATING A PHASE CHANGE MATERIAL AND METHOD TO MAKE THEM

(71) Applicant: Dow Global Technologies LLC, Midland, MI (US)

(72) Inventors: Craig F. Gorin, Midland, MI (US); Aleksander J. Pyzik, Midland, MI (US); Sanjay C. Solanki, Midland, MI (US); Sharon Allen, Midland, MI (US); Daniel P. Sophiea, Lake Orion, MI (US); Niranjan Malvadkar, Auburn, MI (US); Daniel L. Dermody, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 818 days.

(21) Appl. No.: 16/312,370

(22) PCT Filed: Jun. 26, 2017

(86) PCT No.: PCT/US2017/039253
§ 371 (c)(1),
(2) Date: Dec. 21, 2018

(87) PCT Pub. No.: WO2018/005349
PCT Pub. Date: Jan. 4, 2018

(65) Prior Publication Data
US 2019/0248065 A1 Aug. 15, 2019

Related U.S. Application Data

(60) Provisional application No. 62/355,539, filed on Jun. 28, 2016.

(51) Int. Cl.
*B29C 64/118* (2017.01)
*B33Y 80/00* (2015.01)
(Continued)

(52) U.S. Cl.
CPC .......... *B29C 64/118* (2017.08); *B29C 64/106* (2017.08); *B33Y 10/00* (2014.12);
(Continued)

(58) Field of Classification Search
None
See application file for complete search history.

(56) References Cited

U.S. PATENT DOCUMENTS

| 4,513,053 A | 4/1985 | Chen et al. |
| 4,575,330 A | 3/1986 | Hull |

(Continued)

FOREIGN PATENT DOCUMENTS

| CN | 104801704 | 7/2015 |
| JP | 2003181941 | 7/2003 |

(Continued)

OTHER PUBLICATIONS

Office Action from corresponding Japanese Patent Application No. 2018-566479, dated Oct. 11, 2021.
(Continued)

*Primary Examiner* — Mohammad M Ameen

(57) ABSTRACT

An additive manufactured article is comprised of at least two adhered layers of extrudates (120) comprised of a thermoset material having therein a phase change material, wherein the phase change material undergoes a phase change at a temperature less than where the thermoset material decomposes. The article may be made by dispensing a mixture comprised of an organic reactive material and phase change material forming extrudates that are 3D printed into an article having multiple layers of extrudates bound together and then allow-
(Continued)

ing the organic reactive material to react forming a thermoset material having therein the phase change material to form the additive manufactured article. The shape of the article may be changed by heating to a temperature above the temperature where the phase change material undergoes a phase change while applying a force and then cooling below the phase change temperature. Likewise, the original shape may be returned by merely heating above the phase change temperature and then cooling in the absence of a force being applied.

9 Claims, 2 Drawing Sheets

(51) Int. Cl.
| | |
|---|---|
| B33Y 70/00 | (2020.01) |
| B33Y 10/00 | (2015.01) |
| B29C 64/106 | (2017.01) |
| C08G 18/12 | (2006.01) |
| B29K 101/10 | (2006.01) |
| B29K 75/00 | (2006.01) |

(52) U.S. Cl.
CPC ............... *B33Y 70/00* (2014.12); *B33Y 80/00* (2014.12); *C08G 18/12* (2013.01); *B29C 2945/76892* (2013.01); *B29K 2075/00* (2013.01); *B29K 2101/10* (2013.01)

(56) References Cited

U.S. PATENT DOCUMENTS

| | | | |
|---|---|---|---|
| 4,863,538 | A | 9/1989 | Deckard |
| 5,121,329 | A | 6/1992 | Crump |
| 5,204,055 | A | 4/1993 | Sachs et al. |
| 5,503,785 | A | 4/1996 | Crump et al. |
| 5,597,589 | A | 1/1997 | Deckard |
| 5,733,497 | A | 3/1998 | McAlea et al. |
| 5,804,297 | A | 9/1998 | Colvin et al. |
| 5,922,809 | A | 7/1999 | Bhat et al. |
| 5,976,305 | A | 11/1999 | Bhat et al. |
| 6,015,475 | A | 1/2000 | Hsieh et al. |
| 6,129,244 | A | 10/2000 | Horth |
| 6,212,073 | B1 | 4/2001 | Yamaguchi |
| 6,613,816 | B2 | 9/2003 | Mahdi et al. |
| 6,709,539 | B2 | 3/2004 | Zhou |
| 6,841,116 | B2 | 1/2005 | Schmidt |
| 6,916,279 | B2 | 7/2005 | Endelman |
| 6,939,610 | B1 | 9/2005 | Kaul |
| 6,942,830 | B2 | 9/2005 | Mulhaupt et al. |
| 7,399,796 | B2 | 7/2008 | Xu et al. |
| 8,313,006 | B2 | 11/2012 | Willner et al. |
| 8,729,168 | B2 | 5/2014 | Jialanella et al. |
| 2002/0100550 | A1 | 8/2002 | Mahdi et al. |
| 2003/0004599 | A1 | 1/2003 | Herbak |
| 2003/0090034 | A1 | 5/2003 | Mulhaupt et al. |
| 2010/0055484 | A1 | 3/2010 | Chretien et al. |
| 2011/0265932 | A1 | 11/2011 | Jialanella et al. |
| 2012/0279654 | A1 | 11/2012 | Jialanella et al. |
| 2014/0072712 | A1* | 3/2014 | Xu ...................... A61C 13/087 427/256 |
| 2015/0158244 | A1 | 6/2015 | Tibbits et al. |
| 2015/0352787 | A1 | 12/2015 | Humbert et al. |
| 2016/0059496 | A1* | 3/2016 | Rothfuss ................. B29C 71/04 428/173 |
| 2016/0151982 | A1* | 6/2016 | Sand ...................... B33Y 80/00 428/201 |

FOREIGN PATENT DOCUMENTS

| | | |
|---|---|---|
| WO | 1997011837 | 4/1997 |
| WO | 2012087490 | 6/2012 |
| WO | 2012151085 | 11/2012 |
| WO | 2014098935 | 6/2014 |
| WO | 2015171307 | 11/2015 |
| WO | 2016036449 | 3/2016 |
| WO | 2016086216 | 6/2016 |

OTHER PUBLICATIONS

Bandyopadhyay, Amit, et. al., "Processing of Piezocomposites by Fused Deposition Technique," J. Am. Ceram. Soc., 1997, p. 1366-1372, v. 80, No. 6.
Cheng, Nadia G., et. al., "Thermally Tunable, Self-Healing Composites for Soft Robotic Applications," Macromolecular Materials and Engineering, 2014, p. 1279-1284, v. 299.
Peng, Shuo, et. al., "Polymeric Phase Change Composites for Thermal Energy Storage," Journal of Applied Polymer Science, 2004, p. 1240-1251, v. 93.
Zhao, C.Y., et. al., "Review on microencapsulated phase change materials (MEPCMs): Fabrication, characterization and applications," Renewable and Sustainable Energy Reviews, 2011, p. 3813-3832, v. 15.
Yu, Kai, et. al., "Controlled Sequential Shape Changing Components by 3D Printing of Shape Memory Polymer Multimaterials," Procedia IUTAM, 2015, p. 193-203, v. 12, Elsevier.
Mao, Yiqi, et. al., "Sequential Self-Folding Structures by 3D Printed Digital Shape Memory Polymers," Scientific Reports, 2015, p. 1-12.
Ge, Qi, et. al., "Active origami by 4D printing," Smart Materials and Structures, 2014, p. 1-15, v. 23.
Ge, Qi, et. al., "Active materials by four-dimension printing," Applied Physics Letters, 2013, v. 103.
Zocca, Andrea, et. al., "Additive Manufacturing of Ceramics: Issues, Potentialities, and Opprotunities," J. Am. Ceram. Soc., 2015, p. 1983-2001, v. 98, No. 7.
Nikzad, M., et. al., "Themo-mechanical properties of a highly filled polymeric composites for Fused Deposition Modeling," Materials and Design, 2011, p. 3448-3456, v. 32, Elsevier.
Kalita, Samar Jyoti, et. al., "Development of controlled porosity polymer-ceramic composite scaffolds via fused deposition modeling," Materials Science and Engineering, 2003, p. 611-620, v. C 23, Elsevier.
Blum, Craig, "Two Component Adhesive Cartridge Systems," FAST, 2008.
"Mixpac Peeler II: The Clever 2-Component-Cartridge—Elegantly Simple," Sulzer Chemtech.
Office Action from corresponding Japanese 2018-566479 application, dated Jun. 29, 2021.

* cited by examiner

1) Heat + Force
2) Cool

1) Heat
2) Cool

1) Heat
2) Cool

1) Heat + Force
2) Cool

THERMOSET ADDITIVE MANUFACTURED ARTICLES INCORPORATING A PHASE CHANGE MATERIAL AND METHOD TO MAKE THEM

FIELD OF THE INVENTION

The invention relates to a method of additive manufacturing of thermoset polymers in which a phase change material is incorporated therein. In particular, the invention is an additive manufacturing method for forming elastomeric parts (e.g., polyurethane) having a phase change material that phase changes at temperature below where the thermoset material starts to decompose.

BACKGROUND OF THE INVENTION

Fused filament fabrication (FFF), which is also commonly called plastic jet printing or fused deposition modeling (FDM) has been used to form 3D parts by using thermoplastic filaments that are drawn into a nozzle heated, melted and then extruded where the extruded filaments fuse together upon cooling (see, for example, U.S. Pat. Nos. 5,121,329 and 5,503,785). Because the technique requires melting of a filament and extrusion, the materials have been limited to thermoplastic polymers (typically nylon), higher temperatures and complex apparatus. In addition, the technique has required support structures that are also extruded when making complex parts that must survive the elevated temperature needed to form the part, while also being easily removed, for example, by dissolving it.

There have been a couple of attempts to 3D manufacture thermoset polymers using a FDM technique such as described by Mulhaupt et al., in U.S. Pat. No. 6,942,830 and Herbak in U.S. Pat. Publ. 2003/0004599. Muhlhaupt describes extruding heated extrudates of reactive components into a liquid medium that provides for buoyancy and reacts with or accelerates the crosslinking of the extrudate components to form a 3D manufactured part. Herbak extruding and reacting foaming monomeric polyisocyanates with glycols, wherein the components form a reacted foam in the matter of seconds, which of course would be expected to realize a significant exothermic reaction and temperature rise.

Stereolithography (SLA) or photosolidification has also been used to make thermoset polymeric parts (see, for example, U.S. Pat. No. 4,575,330). SLA builds up successive layers from particular photocurable resin contained in a vat using UV laser, which makes it difficult to incorporate any other desirable additives. The part being manufactured is supported by a platen within the vat which moves down as each layer is photocured to form the part.

It would be desirable to provide an additive manufacturing method and parts made therefrom that incorporate a phase change material that is operative in useful temperature ranges.

SUMMARY OF THE INVENTION

A first aspect of the invention is method of additive manufacturing a porous inorganic part comprising,
(i) providing a mixture comprised of an organic reactive material and phase change material,
(ii) dispensing said mixture through a nozzle to form an extrudate deposited on a base,
(iii) moving the base, nozzle or combination thereof while dispensing the mixture so that there is horizontal displacement between the base and nozzle in a predetermined pattern to form an initial layer of the mixture on the base,
(iv) repeating steps (ii) and (iii) to form a successive layer of the mixture adhered on the initial layer to form an additive manufactured part, and
(v) allowing the organic reactive material to react forming a thermoset material having therein the phase change material to form the additive manufactured article.

The method surprisingly allows the formation of an additive manufactured article having phase change material, which undergoes the phase change at useful temperatures such as from room temperature (~23° C.) to about 300° C.

A second aspect of the invention is an additive manufactured article comprising at least two adhered layers of extrudates comprised of a thermoset material having therein a phase change material, wherein the phase change material undergoes a phase change at a temperature less than where the thermoset material decomposes. In particular embodiments, the additive article may be heated above the temperature where the phase change occurs (e.g., phase change material melts) and the article's shape may be changed by application of a force and once cooled below the phase change temperature, the shape change retained even after the force is removed. Likewise, the original shape may be recovered by merely heating above the phase change temperature without the application of a force.

The additive manufactured articles may be used to make parts or components that: (i) mitigate heat transients; (ii) require post formation shaping; or (iii) mitigate sound or mechanical vibration. Exemplary applications may include a component that suppresses noise, vibration or harshness (e.g., suspension components in a vehicle), eyeglass frames, shoe soles, gaskets, housings, hoses, fabrics, orthopedic braces and devices, or toys.

DETAILED DESCRIPTION OF THE INVENTION

Figure 1:
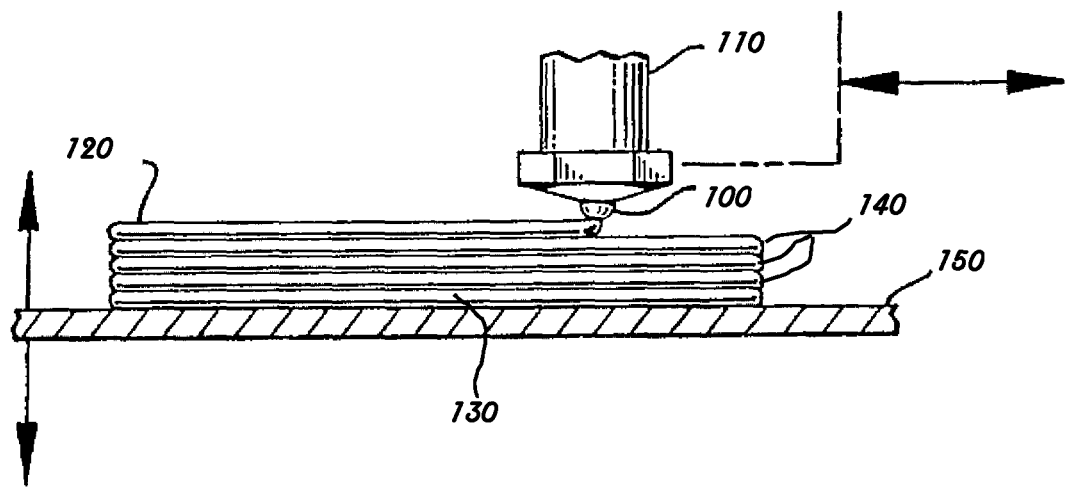
FIG. 1 is a side view of the additive manufactured article of this invention being made by the method of this invention.

The additive manufacturing method involves the use of a mixture comprised of an organic reactive material and phase change material where the organic reactive material generally reacts under the environment it is dispensed to or with a second component simultaneously mixed and dispensed with it and forms a cross-linked or thermoset matrix or material. Typically, the mixture is dispensed into an air atmosphere at any useful or suitable temperature. Surprisingly, the mixture may be dispensed without any heating and retain its shape sufficiently to form an additive manufactured part. Generally, that means at least a portion or all of the mixture flows under shear at ambient temperature (~23 C).

The organic reactive material may be any capable of being additive manufactured by extrusion through a nozzle as described below and then cross-linked to form a thermoset material. Exemplary organic reactive materials may include any of the known thermosetting monomers, resins or prepolymers such as polyurethanes, polyesters, phenol-formaldehyde, melamine, epoxy, or polyimides. Desirably, the organic reactive material is comprised of a prepolymer and in particular a polyurethane prepolymer further described below.

The phase change material in the mixture may be any suitable phase change material that undergoes a phase change where the temperature where the phase change occurs is less than the temperature where the additive manufactured article that is formed decomposes. That is to say, for all practical purposes, the phase change material undergoes the phase change at a temperature below the temperature where the thermoset material formed from the organic reactive material begins to decompose and is dependent on the particular thermoset (e.g., typically below about 400° C.). In an embodiment, the phase change material in the mixture may be any suitable phase change material that undergoes a phase change where the temperature where the phase change occurs is greater than the temperature where the additive manufactured article is formed (e.g., steps (i) through (iv) of the method). Typically, the phase change occurs at a temperature greater than room temperature, but may be lower if specifically desired for applications aimed at temperatures below room temperature (~23° C.). Desirably the phase change occurs at a temperature below 300° C. or 200° C. and for many applications the phase change occurs below 100° C.

Phase change materials are those that undergo a phase change that absorbs or expels heat at a given temperature or in the case of a glass transition over a narrow range of temperature. Desirably the phase change material is one that melts/freezes within the temperature described above. It is of course contemplated that a plurality of phase change materials may be used that have differing phase change temperatures depending on the application. Exemplary phase change materials include hydrated salts such as sodium sulfate, organic materials such as lauric acid, lead, lithium, sodium nitrate, sodium hydroxide, potassium nitrate, potassium hydroxide, $NaOH/Na_2CO_3$ (7.2%), NaCl (26.8%)/NaOH, $NaCl/NaNO_3$ (5.0%), NaCl (42.5%)/KCl (20.5%)/$MgCl_2$, paraffin waxes having from 10 to 40 carbons, formic acid caprilic acid, glycerin, p-lattic acid, methyl palmitate, camphenilone, docasyl bromide, caprylone, phenol, heptadecanon, 1-cyclohexylooctadecane, 4-heptadacanone, p-joluidine, cyanamide, methyl eicosanate, 3-heptadecanone, 2-heptadecanone, hydrocinnamic acid, cetyl acid, α-nepthylamine, camphene, O-nitroaniline, 9-heptadecanone, thymol, methyl behenate, diphenyl amine, p-dichlorobenzene, oxolate, hypophosphoric acid, O-xylene dichloride, β-chloroacetic acid, chloroacetic acid, nitro naphthalene, trimyristin, heptaudecanoic acid, α-chloroacetic acid, bees wax, glyolic acid, glycolic acid, p-bromophenol, azobenzene, acrylic acid, dinto toluent (2,4), phenylacetic acid, thiosinamine, bromcamphor, durene, methly brombenzoate, alpha napthol, glautaric acid, p-xylene dichloride, catechol, quinone, actanilide, succinic anhydride, benzoic acid, stibene, benzamide, acetic acid, polyethylene glycol of differing molecular weights (e.g., 600 MW to 10,000 MW, where weight average molecular weight), capric acid, eladic acid, pentadecanoic acid, tristearin, myristic acid, palmatic acid, stearic acid, acetamide, and methyl fumarate. Paraffin waxes are particularly suitable due to their general availability and range of temperatures where they melt according to amount of carbon chains in the wax.

The phase change material is present in the additive manufactured article in any amount useful to impart a desired characteristic. Typically, the amount of the phase change material within the additive manufactured article is from about 1% to about 50% by volume of the additive manufactured article. Desirably, the amount of phase change material is 5%, 10% or 20% to 40% by volume of the additive manufactured article.

Typically, the phase change material is provided as a solid particulate at the temperature where the additive manufactured article is made. The solid particulates are of a small enough size so that they do not bridge the nozzle used to form extrudates when forming the article. That is the maximum size of the particulates is less than the cross-sectional diameter of the nozzle opening used to form the extrudate or smallest cross-section dimension of the extrudate or if a circular rod extrudate, the extrudate cross-sectional diameter. Typically, the maximum size is a half, tenth or less of the cross-sectional diameter of the extrudate. Generally, the phase change material has an average particle size of 0.1 or 1 micrometer to 10, 20, 30, 40 or 50 micrometers by number.

The phase change material in the additive manufactured article typically is dispersed within the thermoset material, the thermoset material forming a continuous matrix enveloping the phase change particulates. It is understood that some or many of the particulates may be in contact with each other within the matrix of thermoset material and may upon melting become further conjoined into a larger pocket of phase change material enveloped by the thermoset matrix. Generally, the particulates of the phase change material are uniformly distributed within the extrudate and additive manufactured article. Uniformly, meaning that the amount of phase change material at any cross-sectional region (i.e., about 5% to 10% of a cross-section) has essentially the same amount (i.e., ±10%) of phase change material (same volume as determined microscopically by area) as any other similar sized region in the cross-section.

The organic reactive material may be provided as one component or multiple components (2 or more). Generally, the organic reactive material is provided as one component or two separate components. When the organic reactive material is provided as one component, the reactive organic material generally reacts in the atmosphere it is dispensed into such as moisture present in air to form the desired additive manufactured part. Illustratively, when the organic reactive material is provided as two components (separately until dispensed), one component contains the reactive organic material that reacts with one or more compounds in the other component and they generally react with each other upon mixing just prior to dispensing to form the desired additive manufactured part. A component when supplied in a mixture having more than one component may have one or more constituents that react with the atmosphere also, but is not required.

Generally, the mixture has a high viscosity at low shear to aid in the retention of the shape after being dispensed. "High viscosity" means that the viscosity of the material or a component making up the material is at least about 10,000, 20,000, or 30,000 centipoise to about 2,000,000 or 1,000,000 centipoise. It is also preferred that if the mixture is provided in more than one component that each of the components has a viscosity that is within about 50% of each other component under the same shear strain rate close to the strain rate expected to be used to dispense the material. "Near" means the strain rate is ±50% of the strain rate typically used to dispense the reactive materials. It is even more preferred if the viscosity is within 40%.

A useful indicative low shear measurement is one in which the viscosity is measured using a Brookfield viscometer using a number 5 spindle at the lowest rpm or using a AR2000 Rheometer available from TA Instruments, New Castle, Del. with a continuous flow method where a 4 degree cone plate of 20 mm diameter is used at 25 degree C. along with 152 micrometer gap and a shear sweep from 1 to 150 $s^{-1}$. The viscosity in centipoise at low shear is taken at a shear rate of 5 $s^{-1}$.

Likewise, the mixture desirably has a lower viscosity at higher shear (i.e., is shear thinning) to aid in the ease of dispensing. Generally, it is desirable for the mixture to have a viscosity at 100 $s^{-1}$ that is at least 2, 3, 5, 10 or even 20 or more times less than at a shear rate of 5 $s^{-1}$.

In a particular embodiment, it is desirable for the mixture to have a yield stress prior to flowing, which aids in the retention of the cross-sectional shape imparted by the nozzle opening during extrusion through the opening. The yield stress is characterized by measuring G', the storage modulus, using a rheometer. In measuring the yield stress, the mixture is first mixed at high shear such as mixing in a container with paddle blades rotating at 200 rpm for about 1 minute. The mixture is then placed in a rheometer (e.g., AR2000 rheometer from TA Instruments) and an oscillatory stress sweep from 10 to 10,000 Pa at a frequency of 0.1 Hz is performed accordingly. A suitable measuring device geometry is a 25 mm parallel plate having a gap of about 1,000 micrometers. Prior to performing the sweep, a dynamic pre-shear is used to mitigate any residual normal force caused by setting the gap of the parallel plate. A suitable dynamic pre-shear consists of a 0.01 rad displacement at a frequency of 1 Hz for about 1 min.

Generally the yield stress is at least about 20 Pa, 30 Pa, 40 Pa to about 2000 Pa. Likewise, the time to recover the yield stress after being sheared to flow at high shear or the shear experienced upon dispensing is as short as possible. For example, it is desirable that at least about 50% of the yield stress is recovered in fractions of second or at most about 1, 5 or even 10 seconds after being sheared.

The recovery of a sufficient amount of yield strength or stress may be determined by the mixtures sag performance after being sheared by a pump and applied to a substrate. Sag may be determined by the method described by Pyzik et al., in copending application PCT/US15/055266 on page 5 lines 12 to 23 and FIGS. 1 and 2.

The desirable rheological properties described above may be realized in the mixture, as an example, by use of a prepolymer as the organic reactive material mixed with inorganic particulates. In an illustrative embodiment, the prepolymer is an isocyanate terminated prepolymer. The amount of isocyanate is present in a sufficient quantity to provide adhesive character between the extrudates during the formation of the additive manufactured part. Such prepolymers also have an average isocyanate functionality sufficient to allow the preparation of a crosslinked polyurethane upon dispensing, but not so high that the polymers are unstable. "Stability" in this context means that the material prepared from the prepolymer has a shelf life of at least three months at ambient temperature, in that it does not demonstrate an increase in viscosity during such period which prevents its dispensing, application or use. For example, the viscosity should not rise too greatly to make it impractical to dispense. Preferably, the material does not undergo an increase in viscosity of more than about 50 percent during the stated period.

The prepolymer of the mixture desirably has a total NCO content which facilitates acceptable strength in parts prepared after 60 minutes and stability of the prepolymer. Total NCO content includes the NCOs from the isocyanate terminated prepolymer or unreacted isocyanates used to make the prepolymers. Preferably, the NCO content is about 0.6 percent by weight or greater based on the weight of the prepolymer and more preferably about 0.9 percent by weight or greater, and preferably about 4.0 percent by weight or less, more preferably about 3.5 percent by weight or less, even more preferably about 3.0 percent by weight or less, and even more preferably about 2.6 percent by weight or less. Below about 0.6 percent by weight, the prepolymer viscosity may be too high to handle and the working time may be too short even if dispensable.

Preferable polyisocyanates for use in preparing the illustrative prepolymer include those disclosed in U.S. Pat. No. 5,922,809 at col. 3, line 32 to column 4, line 24, incorporated herein by reference. Preferably, the polyisocyanate is an aromatic or cycloaliphatic polyisocyanate such as diphenylmethane-4,4'-diisocyanate, isophorone diisocyanate, tetramethylxylene diisocyanate, and is most preferably diphenylmethane-4,4'-diisocyanate. The diols and triols are generically referred to as polyols.

The prepolymers are made from isocyanate reactive compounds, but preferably are made using polyols such as diols and triols such as those described in U.S. Pat. No. 5,922,809 at column 4, line 60 to column 5, line 50, incorporated herein by reference. The polyols (diols and triols) are polyether polyols and more preferably polyoxyalkylene oxide polyols. The most preferred triols are ethylene oxide-capped polyols prepared by reacting glycerin with propylene oxide, followed by reacting the product with ethylene oxide.

Preferably, the polyether is chosen to decrease the polarity of the prepolymer. A significant factor in determining the polarity of the prepolymer is the amount of ethylene oxide units in the polyether used to prepare the prepolymer. Preferably, the ethylene oxide content in the prepolymer is about 3 percent by weight or less, more preferably about 1.2 percent by weight or less and most preferably about 0.8 percent by weight or less. As used herein "polarity" refers to the impact of the presence of polar groups in the backbone of the prepolymer. It is also understood that a small amount of other polyols may be used to form the polyether prepolymer such as a polyester polyol such as those known in the art. Typically, such other polyols may be present in an amount of about up to 5% by weight of the polyols used to make said prepolymer. However, said prepolymer may be made in the absence of such polyols.

Another example of an organic reactive material may be a Michael addition reactive system such as described by co-pending U.S. Provisional Application 62/261,919 incorporated herein by reference.

The mixture may also be comprised of inorganic particulates to facilitate realizing the rheological properties described above in addition to the phase change material. Illustrative inorganic particulates maybe any inorganic particulate such as a metal, ceramic or carbon. The average particle size of the inorganic particles is generally less than 10 micrometers, 5 micrometers, 2 micrometers or 1 micrometer. In a particular embodiment, essentially all of the particles are less than 1 micrometer (essentially, meaning that there may be some very small amount of particles larger than 1 micrometer, but they generally represent less than 1% by number of the particles), but preferably all the particles are less than one micrometer. The particles may be any metal and alloys of metals, for example, aluminum, copper, titanium, iron or nickel that are not phase change materials described above. Likewise, the ceramic particulates may be any useful ceramics particulates desired in the porous additive manufactured article such as oxide, nitrides, carbides, combination of these, or mixture of them. Examples of ceramics include, but are not limited to, silica, alumina, zeolite, calcium oxide, calcium carbonate, talc, titania, zirconia, silicon nitride, clays including, for example, kaolin, surface treated kaolin, calcined kaolin, aluminum silicates and surface treated anhydrous aluminum silicates, and silicon carbide.

The inorganic particles may be in any useful shape such as whiskers, short fibers, platelets, irregular shaped particles, isometric particles or mixture thereof. In an embodiment, the size of the particulates may be small (less than 1 micrometer), but they may have structures where the small particles are bonded together such as illustrated by carbon black or fumed silica. In a desired embodiment, the inorganic particulates are comprised of short carbon fibers or carbon whiskers, with the average length being from 2 to 3 micrometers to about 20 micrometers with the length to diameter ratio being at least about 3, 5 or 10 to 20.

Depending on their structure and the molecular weight of the prepolymers, the inorganic particulates may be comprised of particles that may range over a wide range of structures as given by oil absorption number (ASTM D-2414-09). For example, the inorganic particulates desirably have an oil absorption number (OAN) of about 80 to 200 ccs per 100 grams, when the Mz of the prepolymer is about 65,000. Preferably, the oil absorption of the filler is at least about 90, more preferably at least about 100, and most preferably at least about 110 to preferably at most about 180, more preferably at most about 165 and most preferably at most about 150 ccs/100 grams.

In addition the inorganic particulates desirably have an iodine number that is at least 80. The iodine number is related to the surface area of the inorganic particulates, but also to the presence of volatile species such as unsaturated oils and, sulfur containing compounds in the case of carbon blacks. The iodine number is determined using ASTM D1510-11.

The oil absorption number may be lower than 80 ccs/100 grams, for example, when the OAN times the iodine number of the filler is generally at least 6,000. Preferably, the product of the OAN (cc/100 g) and iodine number (mg/g) is in rising preference at least 7,000; 8,000; 9,000; 10,000; 11,000; 12,000; 13,000 to at most practically obtainable such as 50,000.

The amount of inorganic particulates desired may be determined from, for example, the prepolymer molecular weight and by routine experimentation. Typically, the amount of inorganic particulates is at least in ascending desirability, 3%, 5%, 10%, 15% or 20% to at most, in ascending desirability, 40%, 35%, 30%, by weight of the mixture.

When a carbon black is used, it may be a standard carbon black which is not specially treated to render it nonconductive. Standard carbon black is carbon black which is not specifically surface treated or oxidized. Alternatively, one or more nonconductive carbon blacks may be used exclusively or in conjunction with the standard carbon black. Suitable standard carbon blacks include RAVEN™ 790, RAVEN™ 450, RAVEN™ 500, RAVEN™ 430, RAVEN™ 420 and RAVEN™ 410 carbon blacks available from Colombian and CSX carbon blacks such as ELFTEX S5100 and S7100 and MONARCH 120, 570, and 590 available from Cabot, and PRINTEX™ 30 carbon black available from Evonik Industries, Mobile, Ala. Suitable non-conductive carbon blacks include RAVEN™ 1040 and RAVEN™ 1060 carbon black available from Colombian Chemicals Company, Marietta, Ga.

The mixture may also be comprised of reactive silicon. The reactive silicon may be present as a separate molecule such as a silane. It may be present within the backbone or as a terminal group in the prepolymer described above. The reactive silicon, generally is one that can undergo hydrolysis such as described at column 4, lines 25-55 of U.S. Pat. No. 6,613,816. Other illustrative reactive silicons may be found in U.S. Patent Publication 2002/0100550 paragraphs 0055 to 0065 and Hsieh, U.S. Pat. No. 6,015,475, column 5, line 27 to column 6, line 41, incorporated herein by reference.

The amount of reactive silicon, when present in the mixture is, generally, about 0.001% to 2% by weight of the total weight of the organic reactive material regardless of whether it is provided in one component or more. The amount of the reactive silicon (note, the weight of the silicon itself and does not include, for example, the organic groups appended thereto), may be at least 0.005%, 0.01%, 0.02%, 0.04%, 0.06%, 0.08% or 0.1% to at most 1.8%, 1.6%, 1.4%, 1.2%, 1%, 0.8%, 0.5% of the material.

The mixture may also be comprised of one or more organic based polymers dispersed therein. Preferably, the organic based polymer is included in the prepolymer by inclusion of a dispersion triol having dispersed therein particles of an organic based polymer. Dispersion triols typically understood to have at least a portion of the particles being grafted with the polyol. The preferable dispersion triols are disclosed in Zhou, U.S. Pat. No. 6,709,539 at column 4, line 13 to column 6, line 18, incorporated herein by reference. Preferably, the triol used to disperse the organic particles is a polyether triol and more preferably a polyoxyalkylene based triol. Preferably, such polyoxyalkylene oxide triol comprises a polyoxypropylene chain with a polyoxyethylene end cap. Preferably, the triols used have a molecular weight of about 4,000 or greater, more preferably about 5,000 or greater and most preferably about 6,000 or greater. Preferably, such triol has molecular weight of about 8,000 or less and more preferably about 7,000 or less. It is understood that the polyol of the dispersion polyol (e.g., triol) is included in the polyol to make the prepolymer described herein, where the copolymer particles of the dispersion polyol are understood to be fillers in the composition.

Preferably, the particles dispersed in the dispersion triol comprise a thermoplastic polymer, rubber-modified thermoplastic polymer or a polyurea dispersed in a triol. The polyurea preferably comprises the reaction product of a polyamine and a polyisocyanate. Preferable thermoplastic polymers are those based on monovinylidene aromatic monomers and copolymers of monovinylidene aromatic monomers with conjugated dienes, acrylates, methacrylates, unsaturated nitriles or mixtures thereof. The copolymers can be block or random copolymers. More preferably, the particles dispersed in the triol comprise copolymers of unsaturated nitriles, conjugated dienes and a monovinylidene aromatic monomer, a copolymer of an unsaturated nitrile and a monovinylidene aromatic monomer or a polyurea. Even more preferably, the particles comprise a polyurea or polystyrene-acrylonitrile copolymer with the polystyrene-acrylonitrile copolymers being most preferred. The organic polymer particles dispersed in the triol preferably have a particle size which is large enough to improve one or more properties such as impact properties and elastomeric properties of the finally cured additive manufactured part. The particles may be dispersed in the triol or grafted to the backbone to at least a portion of the triols if not all of them. Preferably, the particle size is about 10 microns or greater and more preferably the particle size is about 20 microns or greater.

The polyols are present in an amount sufficient to react with most of the isocyanate groups of the isocyanates leaving enough isocyanate groups to correspond with the desired free isocyanate content of the prepolymer. Preferably, the polyols are present in an amount of about 30 percent by weight or greater based on the prepolymer, more preferably about 40 percent by weight or greater and most preferably about 55 percent by weight or greater. Preferably, the polyols are present in an amount of about 75 percent by weight or less based on the prepolymer, more preferably about 65 percent by weight or less and most preferably about 60 percent by weight or less.

Generally, the mixture incorporating the illustrative prepolymer has a ratio of diols to triols and dispersion triols to achieve the desired cure rate and strength of the thermoset material that forms when manufacturing the porous inorganic article (i.e., prior to decomposing the thermosetting material formed from the organic reactive material). The weight ratio of diol to triol and dispersion triol, if present, is preferably about 0.8 or greater and more preferably about 0.85 or greater and most preferably about 0.9 or greater. The weight ratio of diol to triol and dispersion triol, if present, is preferably about 3.0 or less; more preferably about 2.0 or less and most preferably about 1.75 or less. In the embodiment where the polyols comprise a mixture of diols and triols, the amount of diols present is preferably about 15 percent by weight or greater based on the prepolymer, more preferably about 25 percent by weight or greater and most preferably about 28 percent by weight or greater, and about 40 percent by weight or less based on the prepolymer, more preferably about 35 percent by weight or less and most preferably about 30 percent by weight or less. In the embodiment where the polyols comprise a mixture of diols and triols, the total amount of triols (non-dispersion triol and dispersion triol) present is preferably about 15 percent by weight or greater based on the prepolymer, more preferably about 18 percent by weight or greater and most preferably about 20 percent by weight or greater, and preferably about 45 percent by weight or less based on the prepolymer, more preferably about 35 percent by weight or less and most preferably about 32 percent by weight or less.

The dispersion of organic polymer particles in a triol may be present in the prepolymer in an amount of about 10 percent by weight or greater of the prepolymer and more preferably about 12 percent by weight or greater, and about 18 percent by weight or less of the prepolymer and more preferably about 15 percent by weight or less.

The mixture may further comprise a plasticizer. The plasticizers may be used so as to modify the rheological properties to a desired consistency. Such plasticizers should be free of water and inert to isocyanate groups when using the illustrative prepolymer. The plasticizers may be common plasticizers useful in polyurethane and well known to those skilled in the art and are referred hereinafter as low polar plasticizers. The plasticizer is present in an amount sufficient to disperse the prepolymer of material. The plasticizer can be added to the prepolymer either during preparation of the prepolymer or during compounding of the prepolymer prior to being placed into the first compartment. Preferably, the plasticizer is present in about 1 percent by weight or greater of the prepolymer formulation (prepolymer plus plasticizer), more preferably about 20 percent by weight or greater and most preferably about 30 percent by weight or greater. Preferably, the plasticizer is present in about 45 percent by weight or less of the prepolymer formulation and more preferably about 35 percent by weight or less.

Preferably two plasticizers are used, with one being a high polar plasticizer and one being a low polar plasticizer. A high polar plasticizer is a plasticizer with a polarity greater than the polarity of the aromatic diesters, such as the phthalate esters. A low polar plasticizer is a plasticizer which has a polarity the same as or less than the aromatic diesters.

Suitable high polar plasticizers include one or more of alkyl esters of sulfonic acid, alkyl alkylethers diesters, polyester resins, polyglycol diesters, polymeric polyesters, tricarboxylic esters, dialkylether diesters, dialkylether aromatic esters, aromatic phosphate esters, and aromatic sulfonamides. More preferred high polar plasticizers include aromatic sulfonamides, aromatic phosphate esters, dialkyl ether aromatic esters and alkyl esters of sulfonic acid. Most preferred high polar plasticizers include alkyl esters of sulfonic acid and toluene-sulfamide. Alkyl esters of sulfonic acid include alkylsulphonic phenyl ester available from Lanxess under the trademark MESAMOLL. Aromatic phosphate esters include PHOSFLEX™ 31 L isopropylated triphenyl phosphate ester, DISFLAMOLL™ DPO diphenyl-2-ethyl hexyl phosphate, and DISFLAMOL™ TKP tricresyl phosphate. Dialkylether aromatic esters include BENZOFLE™ 2-45 diethylene glycol dibenzoate. Aromatic sulfonamides include KETJENFLE™ 8 o and p, N-ethyl toluenesulfonamide.

Suitable low polar plasticizers include one or more aromatic diesters, aromatic triesters, aliphatic diesters, epoxidized esters, epoxidized oils, chlorinated hydrocarbons, aromatic oils, alkylether monoesters, naphthenic oils, alkyl monoesters, glyceride oils, parraffinic oils and silicone oils. Preferred low polar plasticizers include alkyl phthalates, such as diisononyl phthalates, dioctylphthalate and dibutylphthalate, partially hydrogenated terpene commercially available as "HB-40", epoxy plasticizers, chloroparaffins, adipic acid esters, castor oil, toluene and alkyl naphthalenes. The most preferred low polar plasticizers are the alkyl phthalates.

The amount of low polar plasticizer in the material is that amount which gives the desired rheological properties. The amounts disclosed herein include those amounts added during preparation of the prepolymer and during compounding of the material. Preferably, low polar plasticizers are used in an amount of about 5 parts by weight or greater based on the weight of material, more preferably about 10 parts by weight or greater, and most preferably about 18 parts by weight or greater. The low polar plasticizer is preferably used in an amount of about 40 parts by weight or less based on the total amount of material, more preferably about 30 parts by weight or less and most preferably about 25 parts by weight or less.

The amount of high polar plasticizer in material is that amount which gives the desired rheological properties and the acceptable sag and string properties of the dispensed reactive materials. Preferably, the high polar plasticizers are used in the material in an amount of about 0.2 parts by weight or greater based on the weight of material, more preferably about 0.5 parts by weight or greater, and most preferably about 1 part by weight or greater. The high polar plasticizer is preferably used in an amount of about 20 parts by weight or less based on the total amount of the material, more preferably about 12 parts by weight or less and most preferably about 8 parts by weight or less.

The prepolymer may be prepared by any suitable method, such as by reacting polyols, such as diols, triols and optionally dispersion triols such as a copolymer polyol or grafted triol, with an excess over stoichiometry of one or more polyisocyanates under reaction conditions sufficient to form a prepolymer having isocyanate functionality and free isocyanate content which meets the criteria discussed above. In a preferable method used to prepare the prepolymer, the polyisocyanates are reacted with one or more diols, one or more triols and, optionally, one or more dispersion triols. Preferable processes for the preparation of the prepolymers are disclosed in U.S. Pat. No. 5,922,809 at column 9, lines 4 to 51, incorporated herein by reference. The prepolymers are present in an amount sufficient such that when the resulting dispensed material dispensed and cure, the additive manufactured part is formed by the method. Preferably, the polyurethane prepolymers are present in an amount of about 20 parts by weight of the mixture or greater, more preferably about 30 parts by weight or greater and most preferably about 35 parts by weight or greater. Preferably, the prepolymers are present in an amount of about 60 parts by weight of the material or less, more preferably about 50 parts by weight or less and even more preferably about 45 parts by weight or less.

The mixture may further comprise a polyfunctional isocyanate, for example, to improve the modulus of the composition in the cured form or adhesion of the extrudates to each other. "Polyfunctional" as used in the context of the isocyanates refers to isocyanates having a functionality of 2 or greater. The polyisocyanates can be any monomeric, oligomeric or polymeric isocyanate having a nominal functionality of about 2.5 or greater. More preferably, the polyfunctional isocyanate has a nominal functionality of about 2.7 or greater. Preferably, the polyfunctional isocyanate has a nominal functionality of about 5 or less, even more preferably about 4.5 or less and most preferably about 3.5 or less. The polyfunctional isocyanate can be any isocyanate which is reactive with the isocyanate polyisocyanate prepolymers used in the composition and which improves the modulus of the cured composition. The polyisocyanates can be monomeric; trimeric isocyanurates or biurets of monomeric isocyanates; oligomeric or polymeric, the reaction product of several units of one or more monomeric isocyanates. Examples of preferred polyfunctional isocyanates include trimers of hexamethylene diisocyanate, such as those available from Bayer under the trademark and designation DESMODUR N3300 and N100, and polymeric isocyanates such as polymeric MDI (methylene diphenyl diisocyanates) such as those marketed by The Dow Chemical Company under the trademark of PAPI, including PAPI 20 polymeric isocyanate. The polyfunctional isocyanates, when present are typically present in an amount sufficient to impact the modulus of the cured compositions of the invention or improve the adhesion to certain substrates described above. The polyfunctional isocyanate, when present, is preferably present in an amount of about 0.5 parts by weight or greater based on the weight of the material, more preferably about 1.0 parts by weight or greater and most preferably about 2 parts by weight or greater. The polyfunctional isocyanate is preferably present in an amount of about 8 parts by weight or less, based on the weight of the material, more preferably about 5 parts by weight or less and most preferably about 4 parts by weight or less.

The mixture may also contain a catalyst which catalyzes the reaction of isocyanate moieties with water or an active hydrogen containing compound, which may be in a second component. Such compounds are well known in the art. The catalyst can be any catalyst known to the skilled artisan for the reaction of isocyanate moieties with water or active hydrogen containing compounds. Among preferred catalysts are organotin compounds, metal alkanoates, and tertiary amines. Mixtures of classes of catalysts may be used. A mixture of a tertiary amine and a metal salt is preferred. Even more preferred are tertiary amines, such as dimorpholino diethyl ether, and a metal alkanoate, such as bismuth octoate. Included in the useful catalysts are organotin compounds such as alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. The organotin catalyst is preferably a dialkyltin dicarboxylate or a dialkyltin dimercaptide. Dialkyltin dicarboxylates with lower total carbon atoms are preferred as they are more active catalysts in the compositions of the invention. The preferred dialkyl dicarboxylates include 1,1-dimethyltin dilaurate, 1,1-dibutyltin diacetate and 1,1-dimethyl dimaleate. Preferred metal alkanoates include bismuth octoate or bismuth neodecanoate. The organotin or metal alkanoate catalyst is present in an amount of about 60 parts per million or greater based on the weight of the material, and more preferably 120 parts by million or greater. The organotin catalyst is present in an amount of about 1.0 percent or less based on the weight of the material, more preferably 0.5 percent by weight or less and most preferably 0.1 percent by weight or less.

Useful tertiary amine catalysts include dimorpholinodialkyl ether, a di((dialkylmorpholino)alkyl) ether, bis-(2-dimethylaminoethyl)ether, triethylene diamine, pentamethyldiethylene triamine, N,N-dimethylcyclohexylamine, N,N-dimethyl piperazine 4-methoxyethyl morpholine, N-methylmorpholine, N-ethyl morpholine and mixtures thereof. A preferred dimorpholinodialkyl ether is dimorpholinodiethyl ether. A preferred di((dialkylmorpholino)alkyl) ether is (di-(2-(3,5-dimethylmorpholino)ethyl)ether). Tertiary amines are preferably employed in an amount, based on the weight of the material of about 0.01 parts by weight or greater, more preferably about 0.05 parts by weight or greater, even more preferably about 0.1 parts by weight or greater and most preferably about 0.2 parts by weight or greater and about 2.0 parts by weight or less, more preferably about 1.75 parts by weight or less, even more preferably about 1.0 parts by weight or less and most preferably about 0.4 parts by weight or less.

The mixture may further comprise stabilizers, which function to protect the prepolymer from moisture, thereby inhibiting advancement and preventing premature crosslinking of the isocyanates in the material. Stabilizers known to the skilled artisan for moisture curing polyurethane compositions may be used. Included among such stabilizers are diethylmalonate, alkylphenol alkylates, paratoluene sulfonic isocyanates, benzoyl chloride and orthoalkyl formates. Such stabilizers are preferably used in an amount of about 0.1 parts by weight or greater based on the total weight of the material, preferably about 0.5 parts by weight or greater and more preferably about 0.8 parts by weight or greater. Such stabilizers are used in an amount of about 5.0 parts by weight or less based on the weight of the material, more preferably about 2.0 parts by weight or less and most preferably about 1.4 parts by weight or less.

The mixture when it is comprised of a second component may be any that reacts with the organic reactive material of a first component. For example, when the first component is comprised of the illustrative prepolymer, the second component may be comprised of reactive hydrogens such as the polyols described above or water.

In one embodiment, the second component is a paste containing water or a reactive constituent that enhances the cure of the first component of the material. A paste containing water or reactive constituent is present to speed up the cure of the material of the first component (i.e., reacts with the isocyanate groups in the first component). The use of such a paste is particularly useful when making larger parts that need to support more weight upon being formed. Examples of such second components that react with isocyanate prepolymers are described by commonly owned copending U.S. Application No. 61/990,136 having an inventor Lirong Zhou and WO/2014/098935, each incorporated herein by reference. In a particular embodiment, the second component is comprised of a polyol having a backbone comprised of an amine group, which is further described in WO/2015/171307.

In another embodiment of a two component system, the organic reactive material is comprised of an acrylate monomer with a catalyst for forming a polyacrylic or polyacrylate are in two separate components making up the material. Said material undergoes two modes of curing to form the additive manufactured part. Exemplary materials having such 2 components are described by U.S. Publ. No. 2012-0279654, Int. Pub. Nos. WO/2012/151085 and WO/2012/087490.

The use of an organic reactive material having 2 components may be desirable, for example, when making larger parts or faster fabrication and use is desired due to the faster increase in the modulus as the material cures. Generally, the modulus is at least 0.1 MPa upon fully curing to any useful modulus, but generally is less than about 50 MPa. Desirably the fully cured modulus is at least about 0.5 MPa or 1 MPa to at most about 25 MPa, 10 MPa, or 5 MPa. The modulus may be determined by the method described by ASTM D4065 measured at 25° C. Desirably, 50% of the final cure is obtained in less than a couple of days at ambient conditions (~23° C. and relative humidities of 5% to 95%). Preferably, 50% cure is obtained in less than a day, 12 hours, 3 or 4 hours, 1 hour or even 30 minutes.

Turning to FIG. 1, the method comprises dispensing the mixture through nozzle 100 attached to the nozzle assembly 110 where the mixture may be mixed in-line if it is provided in more than one component. Upon dispensing the mixture forms an extrudate 120 that forms an initial layer 130 and successive layers 140 on base 150. Nozzle assembly 110 is depicted being orthogonal to base, but may be set at any useful angle to form the extrudate whereby the extrudate 120 and nozzle assembly 110 form an obtuse angle with the extrudate 120 being parallel to the base. In addition, the nozzle assembly 110 may be rotated about its longitudinal axis, for example, to reorient the shape of the opening in the nozzle 100, to create extrudates 120 having differing relationship to the base 150.

The relative motion of the base 150 and nozzle assembly 110 are also shown, but it is understood that the base 150, nozzle assembly 110 or both may be moved to cause the relative motion in any horizontal direction or vertical direction. The motion is made in a predetermined manner, which may be accomplished by any known CAD/CAM methodology and apparatus such as those well known in the art and readily available robotics or computerized machine tool interface. Such pattern forming is described, for example, in U.S. Pat. No. 5,121,329.

The extrudate 120 may be dispensed continuously or disrupted to form the initial layer 130 and successive layers 140. If disrupted extrudates 120 are desired, the nozzle may be comprised of a valve (not pictured) to shut off the flow of the material. Such valve mechanism may be any suitable such as any known electromechanical valves that can easily be controlled by any CAD/CAM methodology in conjunction with the pattern. The dispensing may be performed at any useful temperature, such as heating (e.g., up to 100 or 200° C.) to accelerate curing of the dispensed material, but it is not necessary. It is generally preferred, however, for the temperature to be below where the phase change material melts. Likewise, the dispensing may be performed at a temperature below room temperature depending on the application (e.g., use of a phase change material having a phase change temperature less than room temperature). Typically, the method is performed at a temperature from about 20° C. to 40° C.

When the mixture is comprised of more than one component, the nozzle assembly 110 may also be comprised of a mixer such as an in-line static or dynamic mixer as well as separate compartments to hold the two components. Examples of two component dispensing apparatus and methods that may be suitable include those described in U.S. Pat. Nos. 6,129,244 and 8,313,006 and copending U.S. Appl. No. 61/977,668 having an inventor Huide Zhu as well as those described by Sulzer Chemtech, Mixpac Peeler II product Brochure and by Craig Blum, Two Component Adhesive Cartridge Systems, FAST, July 2008.

Because the mixture may be adhesive, the base 150 may be a low surface energy material such as a polyolefin (e.g., polyethylene or polypropylene) or fluorinated polymer such as Teflon and the like. Alternatively, the base may have a mold release agent such as those known in the polyurethane reaction injection molding art or the base may have a sheet of paper or film of a low energy material placed upon it prior to dispensing and forming the additive manufactured part.

More than one nozzle assembly 110 may be employed to make composite or gradient structures within the additive manufactured part. Likewise, a second nozzle assembly 110 may be employed to dispense a support structure that may be later removed so as to allow more complex geometries to be formed such as described in U.S. Pat. No. 5,503,785. The support material may be any that adds support and be removed easily such as those known in the art, for example, waxes.

After the additive manufactured part is formed, the organic reactive material is allowed to cross link sufficiently to form a thermoset material containing therein the phase change material. The amount of time and atmosphere may be any suitable and may be determined by the starting organic reactive material used. For example, when the illustrative isocyanate terminated prepolymer is used the additive manufactured article may be allowed to cure at room temperature (~23° C.) for several minutes or several days in air having typical relative humidities such as from 5% to essentially 100%. Alternatively, the article may be cured by heating. Such heating may be carried out at any useful temperature and may even exceed where the phase change material may melt so long as the thermoset material has sufficiently cured upon application of heat to adequately contain the phase change material within the additive manufactured article. Generally, the temperature need not be elevated during curing of the organic reactive material and is preferred to be below where the phase change material melts.

After the additive manufactured part has been cured sufficiently to form the thermoset material, the additive manufactured article may be used as fabricated. It may, however, be further heated above where the phase change material undergoes a phase change (e.g., melts) a force applied to change the shape and then cooling why maintaining the changed shape, thus retaining or freezing in the new shape. This subsequent heating may be to any temperature above the phase change temperature and below the temperature where the thermoset material would start to decompose. This further process may be performed as many times as may be useful such as adjustments to eyeglass frames, shoe soles or orthopedic devices as necessary.

Heating above the phase change temperature without the application of a force may also be done to restore or nearly restore the original additive manufactured shape.

The additive manufactured article is particularly useful for a component that suppresses noise, vibration or harshness (e.g., suspension components in transportation vehicles), eyeglass frames, shoe soles, gaskets, housings, hoses, fabrics, orthopedic devices, pneumatic devices (e.g., bladders), sporting equipment (e.g., cooling bands and camping equipment), architectural fabrics or toys.

In a particular embodiment, the additive manufactured article is an additive manufactured article comprising at least two adhered layers of extrudates comprised of a thermoset material having therein a phase change material, wherein the phase change material undergoes a phase change at a temperature less than where the thermoset material decomposes. Desirably, the phase change material is a solid particulate dispersed within the extrudate and the thermoset material is a continuous matrix, wherein, preferably, the phase change material is uniformly distributed within the additive manufactured article as described above. The thermoset material of the additive manufactured article is desirably a polyurethane that is comprised of the reaction product of a prepolymer and the prepolymer is an isocyanate terminated prepolymer. It is desirable in some instances for the reaction product to be comprised of a reaction product of an acrylate monomer, oligomer or prepolymer. Likewise, it may desirable for the reaction product to be comprised of a polyol, wherein the poly may be further comprised of a backbone having an amine group. Generally, the amount of the phase change material in the additive manufactured article is from about 5% to about 50% or 10% to 40% by volume of the additive manufactured article.

EXAMPLES

Prepolymer:

A polyether isocyanate terminated polyurethane prepolymer was prepared as described in Comparative Example 6 of U.S. Pat. No. 8,729,168 and used for all the Examples.

Example 1

30 grams of the prepolymer and 20 grams of paraffin wax (<30 micrometers, screened through 200 mesh sieve, melting point of ~55° C., SPEX, Metuchen N.J.) were mixed at 2000 RPM for 2 minutes using a DAC 400 Speed Mixer (FlackTek Inc, Landrum S.C.) and then 2 grams of ELF-IEX™ S7100 Carbon Black (carbon black filler) available from Cabot Corp. were mixed for a further 2 minutes. After this, 0.35 g 2,2'-dimorpholino-diethylether (DMDEE) catalyst was added, and mixed at 2000 RPM for 2 minutes. The filler had a OAN of about 117 cc/100 g and Iodine number of 189 mg/g. The mixture was then transferred into a plastic bag, and extruded into a 10 cc syringe barrel, plugged with a white Smoothflow piston, and capped with an EFD snap-on endcap, all purchased from Nordson Corporation, Westlake Ohio.

A high pressure dispensing tool, Nordson HP4X, Nordson Corporation, Westlake Ohio, was mounted on an UltraTT EFD automated dispensing system, (Nordson Corporation, Westlake Ohio) which acts as a programmable XYZ stage. The filled syringe was loaded into the dispenser and the material pushed through a 0.41 mm luer lok tapered nozzle (7005009, Nordson Corporation, Westlake Ohio) extruded as a circular extrudate on Synaps Digital XM Polyester-Coated paper (Nekoosa Coated Products, Nekoosa Wis.) laying on the XYZ table. The material was extruded at speed of 25 mm/sec using 45 psi air pressure into 35% RH air at ambient temperature ~23° C. The XYZ table was controlled by a PalmPilot to form single-walled square tubes with side dimensions of 50 mm. 40 layers of extrudates were printed in the Z-direction with a step height between layers of 0.30 mm. After printing was completed, the part was removed (together with paper substrate) and allowed to cure in the 35% RH air. No delamination between individual layers was observed and adhesion was very good. No buckling of build walls or deformation of individual layers was observed.

Figure 2:
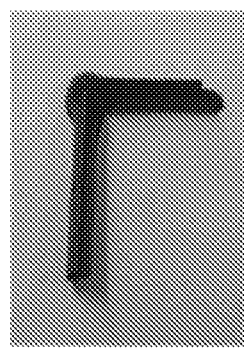
FIG. 2 is a top view of the additive manufactured article of this invention being subjected to reshaping as per a method of this invention.
Figure 2:
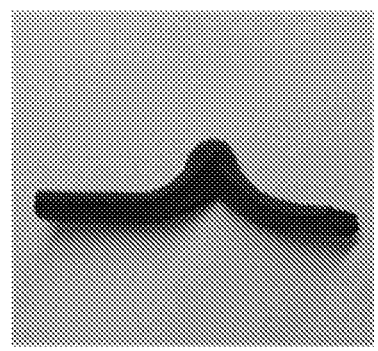
Figure 2:
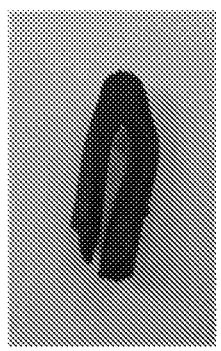
Figure 2:

A portion of the additive manufactured part was then subjected to heat above the phase change temperature of the paraffin wax while applying a force to change its shape and then cooled while maintaining the shape as shown in FIG. 2 (top two pictures from left to right). From this it is clear the part retains the new shape. The part was then subject to heating above the phase change temperature of the paraffin causing the part to return to its original shape as shown in the two right pictures. The part was then again exposed to heating and cooling to show that a new shape may be induced (bottom two pictures). Finally, the part again was returned to its original shape by heating and cooling without the application of a force (bottom left picture to top left picture).

What is claimed is:

1. A method of additive manufacturing a porous inorganic part comprising,
    (i) providing a mixture comprised of an organic reactive material and phase change material,
    (ii) dispensing said mixture through a nozzle to form an extrudate deposited on a base,
    (iii) moving the base, nozzle or combination thereof while dispensing the mixture so that there is horizontal displacement between the base and nozzle in a predetermined pattern to form an initial layer of the mixture on the base,
    (iv) repeating steps (ii) and (iii) to form a successive layer of the mixture adhered on the initial layer to form an additive manufactured part,
    (v) allowing the organic reactive material to react forming a thermoset material having therein the phase change material to form the additive manufactured article;
    (vi) heating the additive manufactured article to a temperature above where the phase change material undergoes the phase change,
    (vii) changing the shape of the additive change article by application of a force and then
    (vii) cooling below the temperature where the phase change material undergoes a phase change thereby causing the additive manufactured article to retain the changed shape.

2. The method of claim 1, wherein the temperature is from 20° C. to 200° C.

3. The method of claim 1, wherein the phase change is melting of the phase change material from a solid to a liquid.

4. The method of claim 2, wherein the melting occurs at a melting temperature from 20° C. to 200° C.

5. The method of claim 1, wherein the phase change material is a solid particulate.

6. The method of claim 5, wherein the extrudate has a cross-sectional diameter and the solid particulate has a maximum particle size that is less than the cross-sectional diameter of the extrudate.

7. The method of claim 6, wherein the maximum particulate size/extrudate cross-sectional diameter is a ratio of at most 0.5.

8. The method of claim 1, wherein the additive manufactured article is further heated above the temperature where the phase change occurs such that the shape returns to the shape prior to being changed.

9. The method of claim 1, wherein the method steps (i) through (iv) are performed at a temperature below where the phase change material undergoes a phase change.

* * * * *